Patented Dec. 27, 1927.

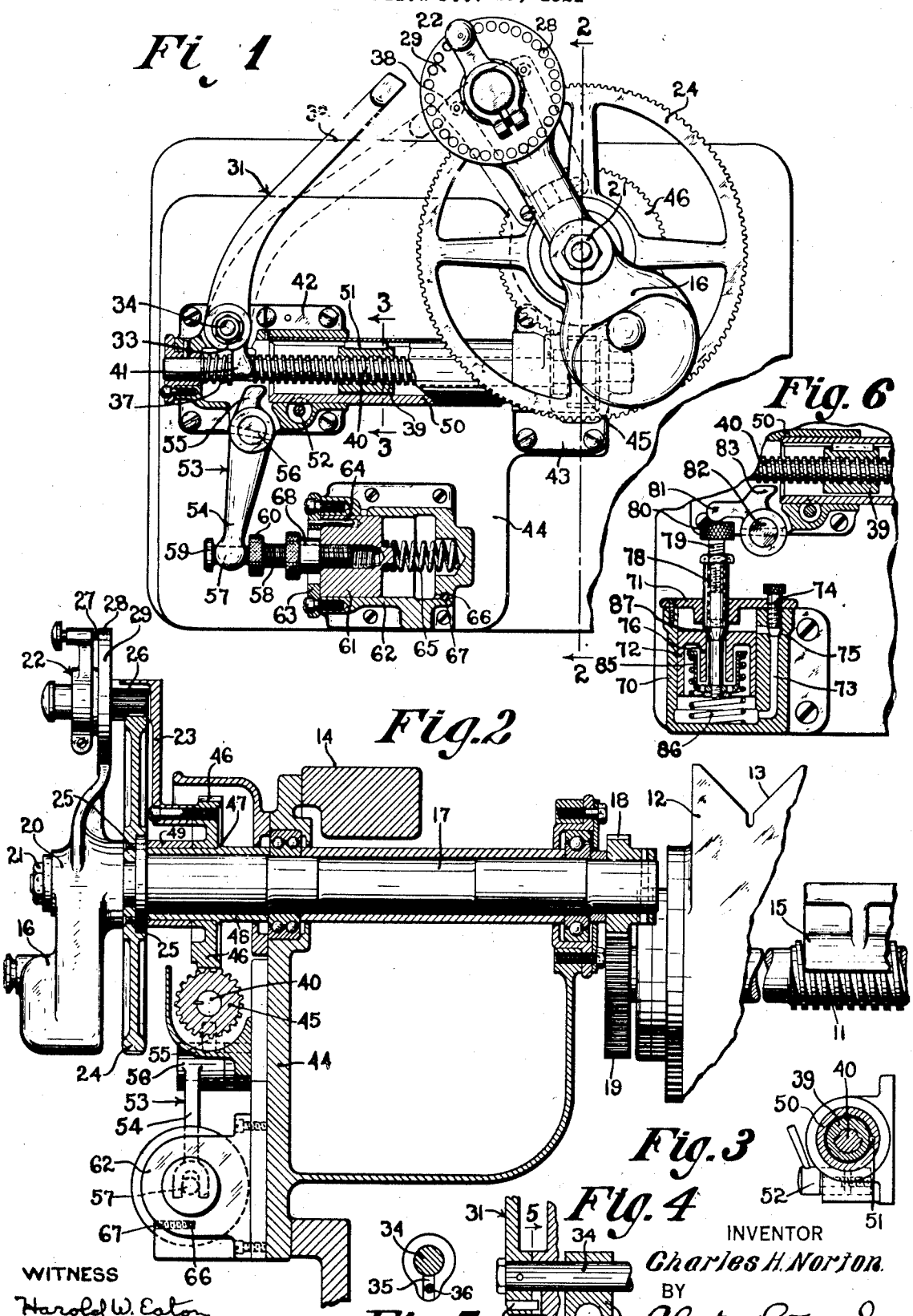

1,653,922

UNITED STATES PATENT OFFICE.

CHARLES H. NORTON, OF WORCESTER, MASSACHUSETTS, ASSIGNOR TO NORTON COMPANY, OF WORCESTER, MASSACHUSETTS, A CORPORATION OF MASSACHUSETTS.

AUTOMATIC CONTROLLING MECHANISM FOR MACHINE-TOOL CROSS FEEDS.

Application filed December 19, 1921. Serial No. 523,417.

My invention relates to a machine tool cross feed and more particularly to a controlling mechanism for cross feeds on cylindrical grinding machines, which automatically limits the feeding movement of the tool. This device is an improvement over my prior invention on a cross feed mechanism for machine tools set forth in my Patent No. 1,416,054 dated May 16, 1922.

In the grinding of certain work, such as pins of crankshafts, it is necessary to turn the feed wheel back a comparatively large number of revolutions, due to the usual geared-down connection of the feed screw to the feed wheel, in order to remove the grinding wheel from the work a distance which allows the calipering of the work or the positioning of the table for grinding another pin. In this operation it is desirable to turn the feed wheel rapidly to move the grinding wheel away from and toward the work, but there is danger that the operator will carelessly feed the wheel forward too far and accidentally run it into the work and cause serious injury thereto.

Furthermore, in order to grind a large number of duplicate pieces, it is desirable that the work be brought automatically to a given size without unnecessary attention on the part of the operator, but any device for positively limiting the movement of the wheel slide should also be capable of permitting the grinding wheel to be removed to a considerable distance from the work and thereafter brought accurately to its former position. Heretofore, it has been necessary for the operator to keep a mental count of the number of revolutions of the feed wheel in moving the grinding wheel rearwardly for positioning new work and then in moving it forward to its initial grinding position. This act of counting has also been necessary in feeding the wheel into the work during the grinding operation, since the automatic stopping device heretofore provided on a cross feed permits but a single turn of the hand wheel and so must not be thrown in until the work is nearly to size.

It is therefore an object of my invention to overcome such difficulties and to provide a cross feed mechanism with an automatic signalling device which may be adjusted for given sizes of work so that the operator may remove the tool from the work to any desired distance and thereafter bring the same forward rapidly until the tool has nearly reached the work, whereupon a signal or warning is given him that he should feed the tool slowly and carefully for the remainder of the distance.

Another object of my invention is to provide an automatic feed controlling mechanism which permits a rapid movement of the tool when distant from the work but automatically limits the rate at which the tool may be fed forward, when a predetermined position has been reached, so that the tool may not thereafter be moved either by power or by hand at a rate faster than it can be safely or efficiently fed into the work.

It is a still further object to combine such a signalling or controlling device with an automatic stopping mechanism so as to prevent injury to the work during the tool feeding operation and, when a predetermined size of work or position of the tool slide has been reached, then automatically prevent further forward movement of the tool slide, whereby a number of duplicate parts may be accurately and rapidly machined with a minimum of attention on the part of the operator.

With these and further objects as will be apparent in the following disclosure, my invention resides in the combination of parts set forth in the specification and covered by the claims appended hereto.

In the drawings in which like numerals represent like parts:

Figure 1 is a front elevation of my improved cross feed mechanism, parts being broken away to more clearly show the construction;

Fig. 2 is a vertical transverse section therethrough approximately on the line 2—2 of Fig. 1, showing a part of the base in section and part of the feed screw and half nut engaging it broken away;

Fig. 3 is a detail in cross section taken on the line 3—3 of Fig. 1;

Fig. 4 is a fragmentary sectional view showing the means for limiting the movement of the stop lever;

Fig. 5 is a section on the line 5—5 of Fig. 4; and

Fig. 6 is a section partly broken away of a modification of the construction shown in Fig. 1.

In accordance with my invention, I provide a machine tool, such as a grinding machine, with a manually operable cross feed mechanism combined with an automatic signalling or speed limiting device operated in timed relation to the cross feed to become effective at a predetermined point on the forward movement of the tool slide. As a further improvement, I preferably combine such a speed limiting device with an automatically operated adjustable stopping mechanism cooperating with the tool slide to limit the movement of the tool and produce any desired size of work. In my preferred construction the signalling device consists of a mechanism which will frictionally resist the rotation of the feed wheel after the slide has reached a given position, so that the operator will not be able to move the tool slide with the same ease and rapidity as before the signalling device became effective. This resistance may be such as to prevent moving the tool at a rate faster than that of a normal cutting operation. The limiting device may be so constructed as to throw a stop into the path of an abutment on the hand feed wheel which is normally used for moving the tool slide.

In the specific embodiment of my invention selected for illustration, the stopping and limiting devices are combined into one mechanism. Referring to the drawings, I have shown the usual cross feed screw 11 mounted in the base 12 of a grinding machine. The base 12 is provided with the usual V-way 13 and the flat way 14 on which the work table (not shown) slides longitudinally and the cross feed screw 11 meshes with the usual half nut 15 which is connected to the wheel slide (not shown) mounted to slide transversely of the base. The cross feed screw 11 may be rotated manually from the front of the machine by means of a crank arm 16 connected to the shaft 17, this shaft driving through reduction gears 18 and 19, to the screw 11. The crank arm 16 is provided with a handle and is loosely sleeved at 20 onto the reduced extension of the shaft 17, being held in place by a nut 21. This arm is adjustably connected to the shaft 17 by means of a micrometer adjustment device 22 carried by an arm 23, connected to the sleeve 20, diametrically opposite the arm 16 and adapted to be locked in adjusted position on the toothed wheel 24 rigidly connected to the shaft 17 as by the pin 25. The details of this micrometer adjusting device are similar to those shown in my prior Patent No. 762,838 dated June 14, 1904, (Fig. 12), the pinion 26 being mounted for axial movement into and out of engagement with the toothed wheel 24 and for rotation to angularly adjust it on the wheel. A spring pressed plunger 27 cooperates with hole 28 in the index plate 29 to lock the pinion in adjusted position.

I provide a stop lever 31 having a relatively long arm 32 and a short arm 41, the hub 33 being pivoted as by means of a pin 34 (Fig. 1) to the base of the machine. This lever 31 is adapted to have a limited movement, which is preferably determined by the width of a slot 35 (Figs. 4 and 5) in the frame, into which extends a short pin 36 connected to the lever 31. The lever 31 is preferably held in inoperative position, as shown in full lines in Fig. 1, by means of a spring 37 and is adapted to be moved to its operative position (shown in dotted lines in Fig. 1) after a predetermined number of revolutions of the crank arm 16 in a counterclockwise direction (Fig. 1) which is the direction for feeding the wheel slide toward the work.

It will also be clear from the following disclosure that I may combine with the manually operated feed device shown in the drawings a further mechanism for moving the slide by power, as shown in my prior application No. 457,929, but such features are not essential for a successful operation of the device covered by this invention.

The mechanism for causing the movement of the lever 31 to its operative position where the end of its long arm 32 rides in the path of an abutment 38 on the arm 23 consists of a means active after a predetermined number of revolutions to engage the lever. This means may comprise a nut 39, travelling along a screw 40 and adapted to engage an arm 41 preferably forked to straddle the screw 40 and secure it to the pivot pin 34. This screw is mounted for rotation in the bearing brackets 42 and 43 secured as by means of screws to the plate 44, and is geared to the cross feed mechanism. The screw 40 is provided with a spiral pinion 45 keyed thereto, and this pinion meshes with a spiral gear 46, loosely mounted between the flange 47 on the spacing sleeve 48, surrounding the shaft 17, and a short sleeve 49 surrounding the sleeve 48. The gear 46 is rigidly connected to the arm 23 by bolts. The nut 39 is held against rotation in a tubular member or sleeve 50 by means of the slide or key connection 51, this sleeve 50 being held at its end in suitable bearings in the brackets 42 and 43, the bearing bracket 42 being provided with a clamp nut and screw 52 (Fig. 3) to rigidly clamp the member 50 in adjusted position. When it is desired to move the nut 39 along the screw 40 without rotating the crank and feed screw, the clamp screw 52 is loosened and the member 50 can then be rotated. To easily effect such rotation manually, the sleeve 50 may be provided with a knurled portion (not shown).

To signal the operator of the approach of the grinding wheel to the work and to limit the rate of feeding the wheel, I may provide a dashpot which will resist the movement of nut 39 after it has reached a certain position. This dashpot may be of the pneumatic type as shown in Fig. 1, or hydraulic as shown in Fig. 6. Referring to the construction illustrated in Figs. 1 to 5 inclusive, the nut may operate the dashpot piston through a connecting lever 53 which has a relatively long arm 54 and a short arm 55. The lever is pivoted to the bearing bracket 42 by means of a pin 56. The short arm 55 is located so that the nut 39 moving along the screw 40 will strike and impart motion to the lever 53 before the arm 32 is brought into the path of the abutment 38. The lower end of the long arm 54 is forked and straddles the reduced portion 57 of the piston screw 58, between the flanges 59 and 60. By this construction, any motion of the lever 53 will be imparted to the piston screw 58 and thus to the dashpot piston 61 into which the screw is adjustably threaded.

The piston 61, which is shown in Fig. 1 as being of the pneumatic type, is slidably fitted into the cylinder 62 mounted, as by means of screws, on the plate 44. A ring 63 fastened on the outer end of the cylinder carries a pin 64 which slides in a socket in the piston, thus limiting the outward motion of the piston and preventing it turning with the screw. Due to a spring 65 within the dashpot and the fact that the air is compressed by the piston, a resisting force is offered when the arm 53 moves the piston screw. The piston 61 is preferably loosely fitted to the cylinder 62 so as to allow a small amount of air to pass by the piston as compression takes place and also to permit air to enter the cylinder on the return stroke. The cylinder may also be provided with a valve or port 66, the opening of which may be varied or entirely closed as by means of a screw 67. This valve or port permits the operator to regulate the amount of air escaping and therefore the amount of compression. The return stroke of the piston 61 is accomplished by the released tension of the compressed spring 65 as nut 39 recedes from the lever 53. The piston screw 58 may be adjusted by screwing in and out of the piston 61 and held in the adjusted position by means of lock nut 68. The adjustment of the screw 58 allows the short arm 55 of the lever 53 to be positioned so that it will be acted on by the nut 39 at the proper time to notify the operator of the approach of the grinding wheel to the work.

When it is desired that the rate of movement of the cross feed be limited to a certain maximum and preferably that of the power cross feed which may be utilized with this device, I preferably employ a hydraulic dashpot. In that case, I may use the construction shown in Fig. 6, in which the dashpot comprises a hollow cylindrical casing 70 enclosed by a cover 71 and having a piston 72 slidable therein. The chamber of the dashpot is filled with oil and a circulation passage 73 around the piston is provided in one wall of the casing, this passage 73 opening into the piston chamber near the top and bottom thereof. In order that the passage 73 may be varied in size and thus regulate the flow of oil therethrough, I provide a needle valve 74 which is screw threaded into the wall of the dashpot and has its lower end conically shaped to fit a corresponding seat 75 in the passage 73 and so regulate or stop the flow of oil.

The piston 72, as shown in the drawing, has an outer cylindrical portion fitting against the walls of the dashpot and an inner flange 76. The piston pin 78, corresponding with the member 58 shown in Fig. 1, passes loosely through a central perforation in the piston and has at its upper end an adjustment screw 79 threaded into a socket of the pin, whereby the position of the head 80 of the pin may be varied as desired. This head 80 is engaged by the arm 81 of a rocking lever mounted on pin 82. The other arm 83 of the lever is engaged by the nut 39 in the same manner as the corresponding parts of the device shown in Fig. 1. The lower end of the pin 78 is fastened by a nut to a cup shaped member 85 surrounding the central flange 76 of the piston. The spring 86 which rests on the bottom of the dashpot engages the upper outwardly turned edge of this cup 85 and being under compression tends to force the piston pin upwardly when the downward pressure is released. The pin 78 has an enlarged portion at its upper end conically shaped to fit a seat 87 in the piston.

By means of this construction, when the piston pin is forced downwardly, this conical portion is seated against the piston when moving it and so closes off the passage formed between the loose piston pin and the larger opening in which it fits; but when the downward pressure is relieved the spring forces the pin upwardly, opening a passage through the piston and permitting oil to escape readily therethrough, the cup 85 being provided with perforations 88 in its lower portion to permit the ready passage of oil therethrough. Upon the upward movement of the piston pin, the cup engages the lower end of the depending flange 76 of the piston and moves it upwardly after the piston pin has been removed from its seat. This construction permits a rapid return of the piston as soon as the pressure from the rocking lever arm 81 has been relieved. In its downward passage, the piston must travel at a slow rate, as determined by the size of the adjustable valve opening. Therefore, the cross feed mechanism can be operated only at a given rate, depending upon the velocity with which the oil may be forced past the piston in the dashpot.

In the operating of my device, it is feasible to set the mechanism so as to warn the operator of the approach of the grinding wheel to the work or, if desired, to prevent his moving the grinding wheel faster than a desired limiting rate. This device permits the work to be ground and thereafter stops the feeding automatically at a desired limit of work size. This is accomplished by first setting the device to grind a given size of work and then adjusting the signalling device in accordance with the size of the work before it is ground. The work stopping mechanism is set by loosening screw 52 to allow of the rotation of the sleeve 50. The cross feed is then operated by turning the handle counterclockwise until the grinding wheel is brought up to the desired point at which grinding is to be stopped, this being usually done by bringing the wheel up against the finished piece of work of the desired size. If the nut 39 happens to engage the short arm of the stop lever 31 before the wheel slide has reached its final position, the operator then rotates the sleeve 50 in such a direction as to cause the nut to recede from the lever. After the wheel slide has been properly positioned, the pinion 26 of the micrometer adjusting device is withdrawn from the wheel 24 and the abutment 38 is moved up against the end of the stop lever and the pinion is then reengaged with the wheel to lock the arm 16 thereto. By this mechanism the wheel slide may be moved rearwardly to the limit of its movement and always brought forward to the same position for which the stop mechanism was set, whereby the operator may grind any number of duplicate pieces with a minimum of attention on his part. If the work is found to be oversize when measured after the wheel slide has been moved forward to the predetermined point, this indicates that the grinding wheel is worn and the operator must then move the abutment from the end of the stop lever a distance corresponding to the amount of wheel wear, as determined by his measurement of the work, and then bring the work to size by again moving the abutment against the stop by rotating the handle.

After having set the work stopping mechanism so as to give the desired size of work, the signalling device is then adjusted by adjusting the screw 58 in Fig. 1 or screw 79 in Fig. 6 so that the travelling nut 39 may strike the short arm 55 of the lever 53 or 83 before the grinding wheel has reached the piece of unfinished work. The setting of the mechanism for moving the arm 31 is accomplished with the finished work in place, whereas the signalling device must be set relative to the work before grinding has commenced. Accordingly, when the nut 39 travels forward as one moves the wheel carriage toward the work to bring the wheel into position, it must operate the dashpot piston before it moves the arm 31. Movement of the piston against the resisting action of the air or the oil in the cylinder tends to retard the rotation of the feed wheel and thus warns the operator that the wheel is near the work. Thereafter the operator is obliged to feed the wheel forward cautiously until it is in contact with the work and the grinding action can proceed. The signalling device, after giving its warning to the operator, while it remains connected with the cross feed mechanism, does not interfere with the forward feeding of the wheel during grinding, since the dashpot is so adjusted that the fluid escapes as fast as it is desired to feed the wheel during the slow feeding of the grinding operation. Thereafter, the nut 39 contacts with the short arm of the lever 31 and automatically throws the stop lever 31 into the path of the abutment 38 which stops the feeding action and brings the grinding operation to a stop at the required point, which has been predetermined by setting the device relative to a piece of work previously ground to size.

It will of course be obvious that if this controlling device is used with a power feed mechanism, such as is shown in my prior application Serial No. 457,929, the dashpot is preferably set to permit a rate of movement substantially equal to that of the power feed. With that construction the operator may bring the tool rapidly forward by hand until the automatic limiting device prevents further rapid movement; then he would ordinarily throw in the power feed and busy himself with some other operation while the tool is brought slowly up to the work and fed into it until the desired size is reached. When the stop lever has acted to prevent further feeding, the grinding wheel continues to rotate, and if a heavy cut has been taken, grinds its way out and forms the required size, after which the wheel is backed away from the work for removing the finished piece and inserting a new one.

Having thus described my invention, what I claim as new and desire to secure by Letters Patents is:

1. In a machine tool having a slide, a cross feed mechanism to move the same in either direction comprising a rotatable screw operatively connected with the slide to move it throughout its entire range of movement, a hand wheel connected with said screw to turn the same in either direction and move the slide rapidly, and automatically operated mechanism effective on the forward movement of the slide to permit movement of the hand wheel with difficulty when the slide has reached a predetermined position and adjustable means effective thereafter to positively stop the slide.

2. In a grinding machine having a work support and a wheel slide, a cross feed mechanism to move said slide towards the work comprising a cross feed screw, manual means for rotating said screw, a signalling device cooperating with said manual means effective to frictionally resist the rotation of said manual means when the wheel has reached a predetermined point and means to automatically stop the feeding movement thereafter.

3. In a grinding machine having a work support and a grinding wheel slide, a cross feed mechanism to move the slide comprising a rotatable screw operatively connected with the slide, a hand wheel connected with said screw to turn the same in either direction and mechanism including a dashpot effective to frictionally retard the rotation of the hand wheel when the slide has been moved to a predetermined position but permit further feeding movement.

4. A grinding machine having a wheel slide, a cross feed screw operatively connected therewith, means to rotate the feed screw rapidly in either direction, a movable member connected with said screw and a dashpot having an operating member located in the path of said movable member, whereby the rotation of said feed screw may be retarded after the slide has reached a given position.

5. In a grinding machine, a wheel slide, a cross feed mechanism for said slide including a rotatable member adapted to move the slide rapidly, a normally inoperative stop adapted to prevent movement of said slide, a slow motion device effective to limit the rate of movement of the slide and means automatically operated by said member to make said device effective when the slide has reached a predetermined position and thereafter move said stop to an operative position to stop the slide at a second predetermined position.

6. A cross feed mechanism for a grinding machine wheel slide comprising a cross feed screw operatively connected with the slide, means for rotating said feed screw, an abutment on said means, a stop lever movable into the path of said abutment, connections between said rotating means and the stop lever for moving it into the path of said abutment after a predetermined number of revolutions of said means and a yielding device cooperating with said feed screw to frictionally resist the movement thereof before the lever is moved into the path of the abutment.

7. In a grinding machine having a work support, a grinding wheel slide, a cross feed mechanism for the slide comprising a manually operable hand wheel connected with the slide for moving it in either direction, an abutment on the hand wheel, a screw operatively connected with said wheel, a normally non-rotatable nut engaging said screw and longitudinally movable thereby, a lever operable by said nut to move into the path of said abutment and a dash pot operated by said nut to resist its movement for a predetermined interval before the lever engages the abutment.

8. In a grinding machine having a work support, a grinding wheel slide, a device for moving the slide, an abutment on said device, a screw operatively connected to the slide, a normally non-rotatable, longitudinally movable nut engaging the screw, a normally inoperative stop lever adapted to be engaged by the nut and moved into the path of said abutment at a desired point and a signalling device adapted to warn the operator of the position of the slide before the stop lever contacts with said abutment comprising a dashpot having a normally inoperative piston, a lever adjustably connected thereto, one end of which lies in the path of and is movable by said nut, and resilient means for returning the piston to its inoperative position after the nut recedes from said lever.

9. In a grinding machine having a work support, a grinding wheel slide, a device for moving the slide having an abutment thereon, a screw operatively connected to said device, a nut engaging the screw, a rotatable sleeve surrounding and slidably keyed to the nut to adjust the latter relative to the screw but normally permit the nut to travel longitudinally, a normally inoperative stop lever adapted to be thrown by said nut into the path of the abutment to stop the feed when the slide has reached a predetermined position and a signalling device having a member in the path of said nut adapted to warn the operator of the position of the slide before the stop lever is thrown against said abutment.

10. In a grinding machine having a work support, a grinding wheel slide, a rotatable device for moving the slide, an abutment on the rotatable device, a screw operatively connected to the rotatable device, a nut engaging the screw, a rotatable sleeve slidably keyed to the nut to adjust the nut relative to the screw, means to lock the sleeve in adjusted position to permit longitudinal movement of the nut, a normally inoperative stop lever adapted to be thrown by the nut into operative position in the path of the abutment when the slide has reached a predetermined position and a signalling device having a member operated by said nut prior to movement of the stop lever against the abutment.

Signed at Worcester, Massachusetts, this 17th day of Dec., 1921.

CHARLES H. NORTON.